No. 798,362. PATENTED AUG. 29, 1905.
R. MORTON.
MACHINE FOR HANDLING OR WORKING PLASTIC MATERIAL AND THE LIKE.
APPLICATION FILED MAR. 16, 1904.
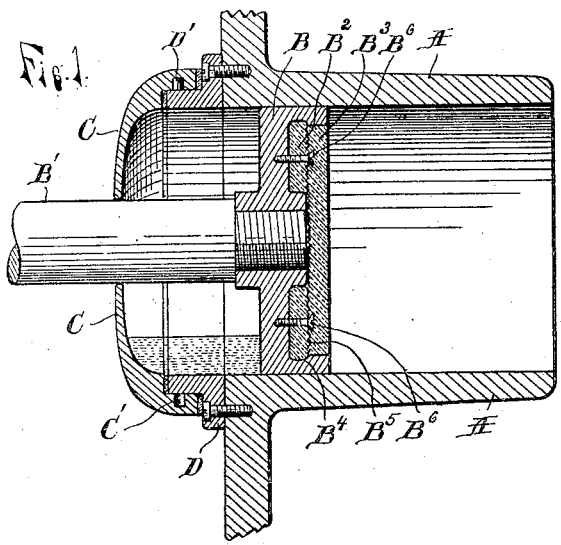
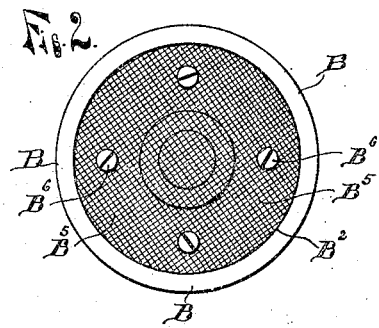
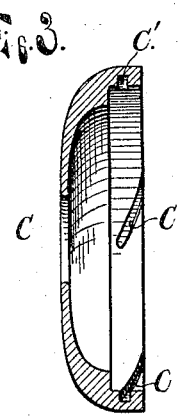
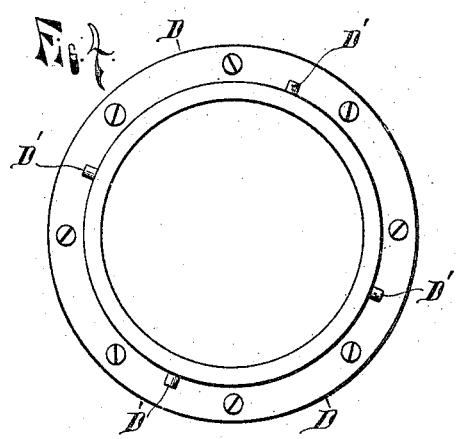
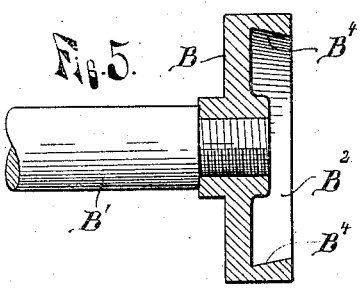
WITNESSES:
Lewis E. Flanders
Oliver C. Barthel
INVENTOR.
Robert Morton
BY Robert O. Barthel
ATTORNEYS.

UNITED STATES PATENT OFFICE.

ROBERT MORTON, OF DETROIT, MICHIGAN.

MACHINE FOR HANDLING OR WORKING PLASTIC MATERIAL AND THE LIKE.

No. 798,362.     Specification of Letters Patent.     Patented Aug. 29, 1905.

Application filed March 16, 1904. Serial No. 198,332.

*To all whom it may concern:*

Be it known that I, ROBERT MORTON, a citizen of the United States of America, residing at Detroit, in the county of Wayne and State of Michigan, have invented certain new and useful Improvements in Machines for Handling or Working Plastic Material and the Like, of which the following is a specification, reference being had therein to the accompanying drawings.

This invention relates to improvements in machines for handling or working plastic material, and more especially to dough-dividing machines in which the mass is fed into a revolving mold-disk comprising a series of cylinders or pockets provided with plungers to eject therefrom the dough loaves thus separated from the mass; and the object of the invention is to provide means for preventing the plastic material from adhering to the plunger-heads and also to provide cheap and efficient means for lubricating the cylinder or receptacle to prevent the material from adhering to the sides thereof, a further object of the invention being to provide means whereby the interiors of the cylinders are made readily accessible for cleaning, and to provide certain other new and useful features and the particular construction, arrangement, and combination of parts, all as hereinafter more fully described, reference being had to the accompanying drawings, in which—

Figure 1 is a longitudinal section through the axis of a cylinder and its plunger embodying the invention; Fig. 2, a face view of the plunger-head; Fig. 3, a section through the axis of the detachable cylinder-head; Fig. 4, a face view of the ring to which the head is attached; and Fig. 5, a section of a plunger, showing a modified construction.

As shown in the drawings, A is a cylindrical receptacle into the open end of which the plastic material may be introduced in any suitable manner, (not shown,) thus measuring and dividing a certain quantity of the material from the mass, and to eject this material from the cylinder through the same open end a plunger-head B, secured to the end of a plunger-rod B', is fitted within the cylinder and means (not shown) provided for moving the plunger in the cylinder at the proper time.

Secured to the rear end of the cylinder is a cup-shaped cylinder-head C, having an axial opening through which the plunger-rod extends, and within the cylinder between this head and the plunger-head is provided oil or any suitable lubricant for lubricating the sides of the cylinder, which is thoroughly oiled when the plunger moves forward, and as a number of these cylinders or pockets are carried by a revolving mold-disk, as ordinarily arranged in dough-dividing machines, the oil will run round on the wall of the cylinder as the disk is revolved, thus touching every part. The plunger is not so tight a fit in the cylinder but what the oil will seep through slightly, and thus the wall of the cylinder will be thoroughly lubricated and the dough prevented from adhering thereto.

To facilitate the removal of the cylinder-head C for the purpose of cleaning the cylinder, a ring D is secured to the end of the cylinder by tap-screws and is provided with a flange to engage a flange on the cylinder-head, the flange on the head being provided with slanting grooves C', forming inclines adapted to be engaged by outwardly-extending pins D' on the ring, so that by entering the pins in the grooves, then giving the head a slight turn, it will be firmly secured in place, the inclines causing the head to be drawn firmly into contact with the ring, suitable packing-rings being interposed to make a tight joint.

To prevent the dough from adhering to the face of the plunger-head B, said face is cut away to form a recess $B^2$ therein, and this recess is filled with any suitable waxy non-adhesive substance $B^3$, such as paraffin, which will not be affected by the moisture of the dough and may be melted and run into the recess, then faced off perfectly smooth. To hold this facing $B^3$ in place, the recess may be formed with an undercut, as at $B^4$, and, if found desirable, to hold the facing in place and strengthen the same a disk of wire fabric or screen $B^5$ may be secured within the recess at a distance from its bottom and below the face of the head by screws $B^6$, or large flat-headed screws alone may be used.

Having thus fully described my invention, what I claim is—

1. In a dough-dividing machine, the combination with the cylinder, of a plunger having an undercut recess in its face and a body of paraffin secured in said recess and forming the facing of said plunger.

2. In a dough-dividing machine, the combination with a receptacle for plastic material, of a plunger having a recess in its face, a body of paraffin in said recess adapted to form a facing for the plunger, and separate means for holding the paraffin in said recess.

3. In a dough-dividing machine, the combination of a cylinder having a closed end, a piston having a facing of non-adherent material in said cylinder and having its piston-rod extending out through an aperture in said closed end, and a lubricant contained within said cylinder between the rear face of said piston and the closed end of the cylinder.

4. The combination with a receptacle for plastic material, of a plunger having a recess in its face, fusible non-adhesive material filling said recess and forming a facing for the plunger, a sheet of woven wire embedded in said material to strengthen the same, and means for securing the wire within the recess to hold the facing in place.

5. The combination with a cylinder closed at one end, of a piston fitting within said cylinder and having its piston-rod extending out through an aperture in said closed end, and a lubricant contained in said cylinder between its closed end and the rear face of the piston adapted to lubricate the walls of the cylinder.

6. The combination of a cylindrical receptacle adapted to receive plastic material from a source of supply, a plunger fitting within said receptacle and adapted to be moved to force the material therefrom, a cylinder-head to close one end of said cylinder, means for detachably securing said head in place, and a lubricant within the cylinder between said head and the plunger to lubricate the walls of the cylinder and prevent the plastic material from adhering thereto.

7. In a dough-dividing machine, the combination of a cylinder having a closed end and adapted to receive plastic material, of a piston in said cylinder having a facing of non-adherent material and adapted to force the material therefrom, and a lubricant in said cylinder between said piston and closed end to lubricate the walls of the cylinder as the cylinder revolves and the piston reciprocates.

8. The combination of a cylindrical receptacle open at each end and adapted to receive plastic material from a source of supply, a plunger fitting within said receptacle and adapted to be moved to force the material therefrom, a cylinder-head to close one end of the cylinder provided with inclined slots, pins on the cylinder to engage said slots and detachably secure the head to the cylinder and a quantity of lubricant within the cylinder between said head and the plunger to flood the cylinder when the plunger is moved toward the opposite end thereof.

9. The combination of a cylindrical receptacle having open ends and adapted to receive plastic material at one end, a ring secured to the opposite end of said receptacle having a flange, a cup-shaped cylinder-head to engage the flanges and provided with inclined grooves, pins on the flange of the ring to engage said grooves, a plunger-head fitting in the cylinder and having a recess in its face, a plunger-rod extending through the cylinder-head and to which the plunger-head is secured, a lubricant in the cylinder between the cylinder-head and the plunger-head, fusible non-adhesive material filling said recess, a disk of woven wire embedded in said material, and screws securing said wire disk in place.

In testimony whereof I affix my signature in presence of two witnesses.

ROBERT MORTON.

Witnesses:
OTTO F. BARTHEL,
LEWIS E. FLANDERS.